(12) United States Patent
Sasso et al.

(10) Patent No.: US 8,699,497 B2
(45) Date of Patent: Apr. 15, 2014

(54) DOMAIN-INDEPENDENT PERSISTENT FIBRE CHANNEL IDENTIFIERS

(75) Inventors: Christian Sasso, Milpitas, CA (US);
Ankur Goyal, San Jose, CA (US);
Siddharth Kasat, San Jose, CA (US);
Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 375 days.

(21) Appl. No.: 12/911,848

(22) Filed: Oct. 26, 2010

(65) Prior Publication Data

US 2012/0099855 A1    Apr. 26, 2012

(51) Int. Cl.
*H04L 12/56*    (2011.01)

(52) U.S. Cl.
USPC ............................ 370/395.3; 398/25; 398/45

(58) Field of Classification Search
USPC .................... 370/395.3, 252, 306; 398/45, 25
See application file for complete search history.

(56) References Cited

U.S. PATENT DOCUMENTS

| | | | | |
|---|---|---|---|---|
| 7,606,167 | B1 * | 10/2009 | DeSanti et al. ............... | 370/254 |
| 2004/0233921 | A1 | 11/2004 | Krieg et al. | |
| 2005/0050268 | A1 * | 3/2005 | Yoshida ........................ | 711/114 |
| 2007/0266132 | A1 * | 11/2007 | Hariharan et al. ............ | 709/223 |
| 2007/0291785 | A1 | 12/2007 | Sharma et al. | |
| 2009/0092141 | A1 * | 4/2009 | Banerjee ........................ | 370/397 |
| 2009/0141657 | A1 * | 6/2009 | Dutt et al. ..................... | 370/254 |
| 2009/0219928 | A1 * | 9/2009 | Sasso et al. ................... | 370/357 |

FOREIGN PATENT DOCUMENTS

WO    03088050 A1    10/2003

OTHER PUBLICATIONS

International Search Report and Written Opinion in counterpart International Application No. PCT/US2011/031914, mailed Sep. 22, 2011.

* cited by examiner

*Primary Examiner* — Yong Zhou
(74) *Attorney, Agent, or Firm* — Edell, Shapiro & Finnan, LLC

(57) ABSTRACT

A Fiber Channel switch is provided for a relative addressing scheme for domain values to avoid losing portions of a Fiber Channel identifier. At a Fiber Channel switch, data is stored that assigns a relative domain field value to a run-time domain. The relative domain field value used for a Fiber Channel identifier is determined for devices connected to the switch based on the run-time domain of the devices and the virtual storage area network in which the devices are active. A Fiber Channel identifier is stored in a memory of the switch that comprises the relative domain field value determined for the device together with area and port values for the device. The relative domain value is either a reserved domain field value for an existing virtual storage area network or any of the regular domain field values for a new virtual storage area network.

24 Claims, 8 Drawing Sheets

| | Actual Run-Time Domain | Reserved Domain Value | Hexadecimal Value |
|---|---|---|---|
| 1 | 1st run-time domain assigned in VSAN x | 0 | 00 |
| | 2nd run-time domain assigned in VSAN x | 240 | F0 |
| | 3rd run-time domain assigned in VSAN x | 241 | F1 |
| | ... | 242 | F2 |
| | ... | 243 | F3 |
| | ... | 244 | F4 |
| | ... | 245 | F5 |
| | ... | 246 | F6 |
| | ... | 247 | F7 |
| | ... | 248 | F8 |
| | ... | 249 | F9 |
| | ... | 250 | FA |
| | ... | 251 | FB |
| | ... | | |
| 17 | 17th run-time domain assigned in VSAN x | 255 | FF |

| | 1 to 239 | 0 to 255 | 0 to 255 |
|---|---|---|---|
| Actual FCID | Domain | Area | Port |
| | 70 | 72 | 74 |

| | 0 to 255 | 0 to 255 | 0 to 255 |
|---|---|---|---|
| Stored FCID: | * | Area | Port |
| | 70 | 72 | 74 |

Reserved values

FIG. 5

| | Actual Run-Time Domain | Reserved Domain Value | Hexadecimal Value |
|---|---|---|---|
| 1 | 1st run-time domain assigned in VSAN x | 0 | 00 |
| | 2nd run-time domain assigned in VSAN x | 240 | F0 |
| | 3rd run-time domain assigned in VSAN x | 241 | F1 |
| | ... | 242 | F2 |
| | ... | 243 | F3 |
| | ... | 244 | F4 |
| | ... | 245 | F5 |
| | ... | 246 | F6 |
| | ... | 247 | F7 |
| | ... | 248 | F8 |
| | ... | 249 | F9 |
| | ... | 250 | FA |
| | ... | 251 | FB |
| | ... | | |
| 17 | 17th run-time domain assigned in VSAN x | 255 | FF |

FIG. 7

VSAN 3 has two run-time domains: 10 and 20
Domain 10 is mapped to reserved domain field value 0 = "00" Hex
Domain 20 is mapped to reserved domain field value 240= "F0" Hex

| VSAN | WWN | FCID (DD:AA:PP) |
|---|---|---|
| 3 | 50:29:00:3C:78:75:A3:01 | F0:02:77 |
| 3 | 50:29:00:3C:78:75:A3:02 | 00:02:12 |
| 3 | 50:29:00:3C:78:75:A3:03 | 00:04:98 |
| 3 | 50:29:00:3C:78:75:A3:04 | F0:09:27 |

Underlined DD field values are the reserved domain field values assigned to Domain 10 and Domain 20, respectively.

DOMAIN-INDEPENDENT PERSISTENT FIBRE CHANNEL IDENTIFIERS

TECHNICAL FIELD

The present disclosure relates to Fibre Channel switches used to route traffic in Fibre Channel networks.

BACKGROUND

In a Fibre Channel network, Fibre Channel switches are deployed to direct traffic between host server devices and storage array devices. The Fibre Channel switches store in memory at least one Fibre Channel identifier for each device that connects to it. The Fibre Channel identifier comprises three absolute values for Domain, Area and Port. When a run-time domain changes, the corresponding Fibre Channel identifiers for that domain become invalid all at once. This causes significant frustration for a network administrator because often the Fibre Channel identifiers are configured manually. In addition, performance of the network is degraded when the Fibre Channel identifiers for devices connected to the switches are lost.

BRIEF DESCRIPTION OF THE DRAWINGS

FIG. 5 is an example of a table illustrating data stored in a Fibre Channel switch that assigns a reserved domain field value to a corresponding one of a plurality of run-time domains in respective ones of a plurality of virtual storage area networks.

FIG. 7 is an example of a table illustrating Fibre Channel identifiers stored for multiple devices in multiple domains of a virtual storage area network through the use of the relative mapping scheme.

DESCRIPTION OF EXAMPLE EMBODIMENTS

Overview

A Fibre Channel switch and related methods are provided for a relative addressing scheme for domain values used by the switch to avoid losing other portions of a Fibre Channel identifier if a particular run-time domain becomes invalid. At a Fibre Channel switch, data is stored that assigns a relative domain field value to a run-time domain in one of a plurality of virtual storage area networks. The relative domain field value used for a Fibre Channel identifier is determined for each of a plurality of devices connected to the Fibre Channel switch based on the run-time domain of the respective devices and the virtual storage area network in which the respective devices are active. A Fibre Channel identifier is stored in a memory of the Fibre Channel switch for each of the plurality of devices. The Fibre Channel identifier comprises the relative domain field value determined for the device together with area and port values for the device. The relative domain value is either a reserved domain field value for an existing virtual storage area network or any of the regular domain field values for a new virtual storage area network. The reserved domain field value is a domain field value that is not to be explicitly used in a Fibre Channel network for Fibre Channel identifiers according to the applicable Fibre Channel industry standards.

Example Embodiments

Figure 1:
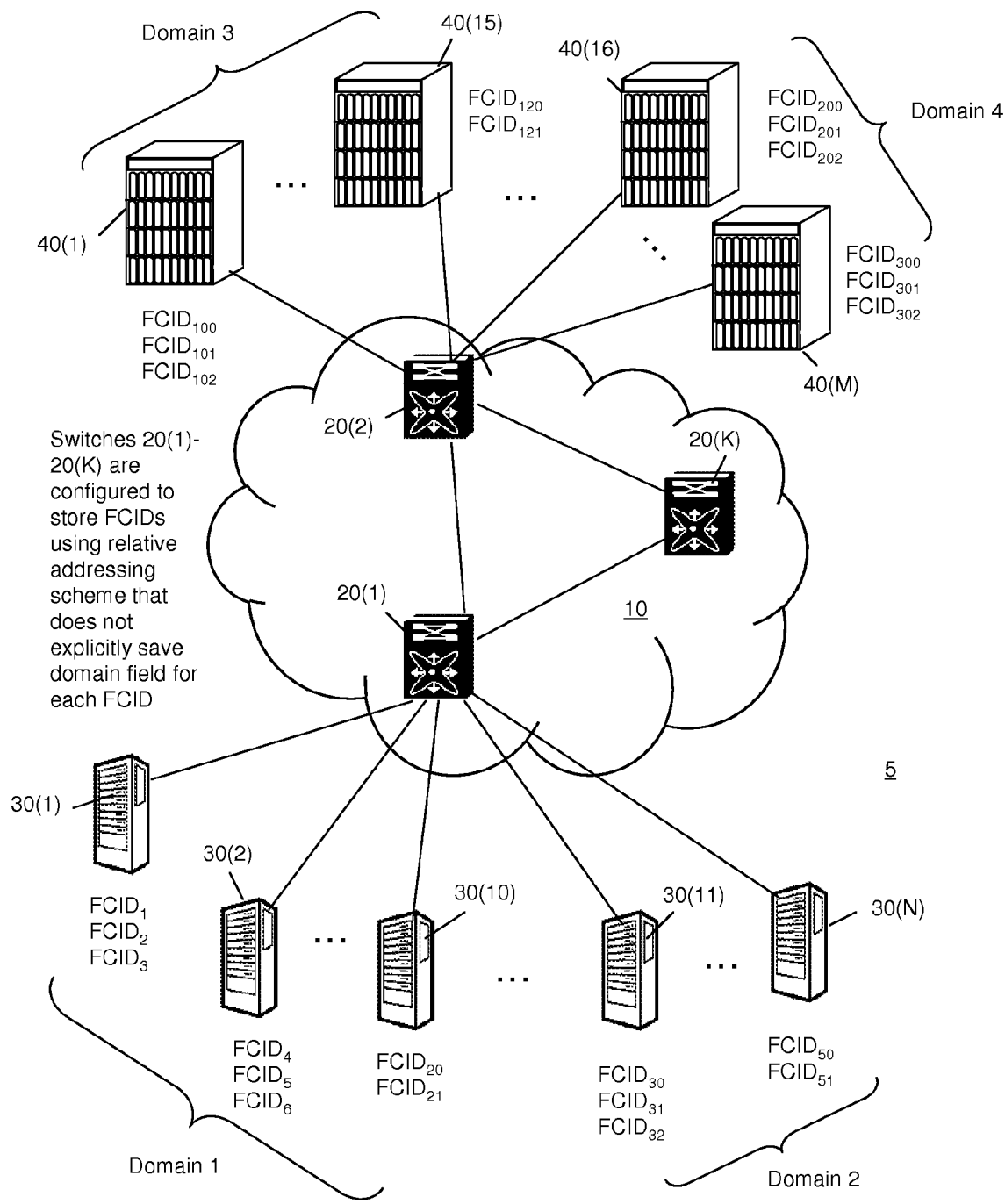
FIG. 1 is an example of a block diagram of a Fibre Channel network in which switches are configured to use a relative addressing scheme when storing the values for the run-time domain in the domain fields of Fibre Channel identifiers for devices.

Referring first to FIG. 1, an example of a Fibre Channel (FC) network environment is generally shown at reference numeral 5. A virtual storage area network (VSAN) is shown at reference numeral 10 and comprising a plurality of FC switches 20(1)-20(K). Each FC switch connects to other FC switches and some edge FC switches also connect to FC devices. For example, switch 20(1) connects to a plurality of host (servers) 30(1)-30(N). Moreover, the switch 20(1) is configured to connect to servers in different run-time domains. For example, servers 30(1)-30(10) are in one domain, Domain 1, and servers 30(11)-30(N) are in another domain, Domain 2. This is only an example as all of the servers connected to switch 20(1) could be in one domain, or they could be distributed across two or more domains. Similarly, switch 20(2) connects to a plurality of FC storage arrays 40(1)-40(M), where storage arrays 40(1)-40(15) are in Domain 3 and storage arrays 40(16)-40(M) are in Domain 4.

As shown in FIG. 1, each device, whether a server or storage array, can have multiple Fibre Channel identifiers (FCIDs) on a switch. For example, server 30(1) has FCIDs $FCID_1$, $FCID_2$, $FCID_3$, server 30(2) is assigned FCIDs $FCID_4$, $FCID_5$, $FCID_6$ and so on Likewise, storage array 40(1) is assigned $FCID_{100}$, $FCID_{101}$, $FCID_{102}$, storage array 40(15) is assigned $FCID_{120}$ and $FCID_{121}$, and so on. According to the techniques described herein, the switches 20(1)-20(N) are configured to store FCIDs for the devices they connect to using a relative addressing scheme that does not explicitly save the domain field for each FCID.

Figure 2:
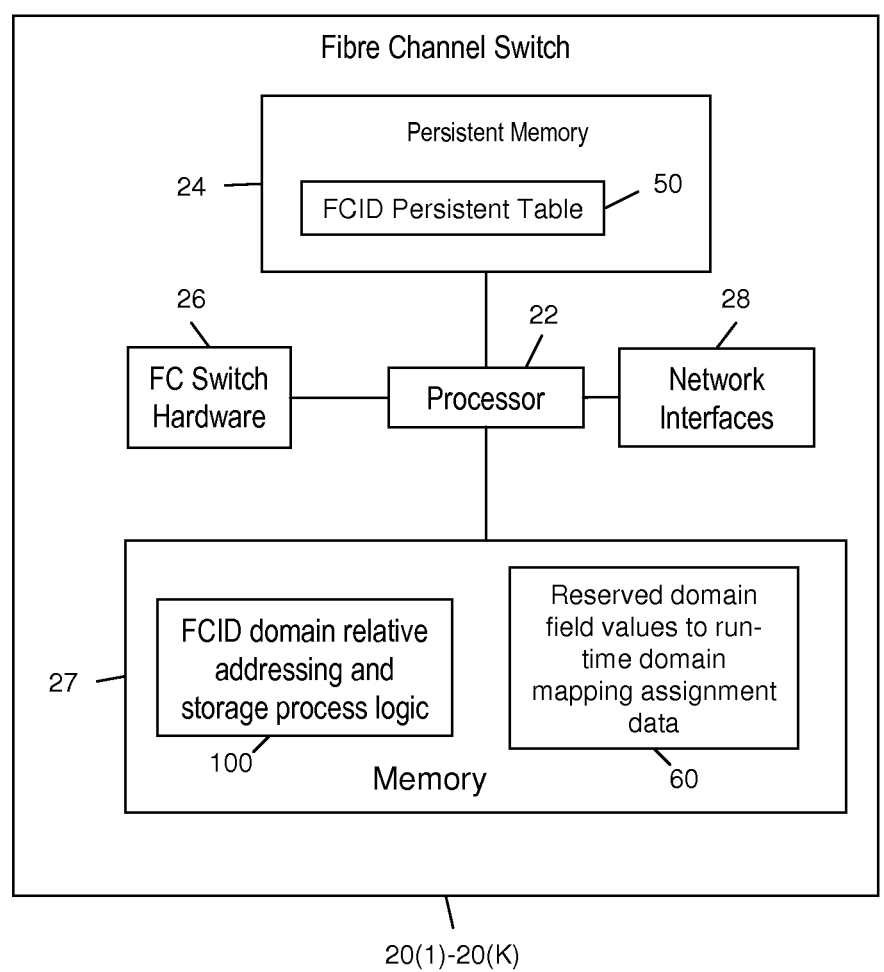
FIG. 2 is an example of a block diagram of a Fibre Channel switch configured to use the relative addressing scheme for domain fields of Fibre Channel identifiers stored in the switch.

Reference is now made to FIG. 2 for a description of a Fibre Channel switch that is configured to store FCIDs using the relative addressing scheme. The FC switch comprises a processor 22, persistent memory 24, FC switch hardware 26, memory 27 and network interfaces 28. The processor 22 serves as a controller for the FC switch and is connected to the persistent memory 24, switch hardware 26, memory 27 and network interfaces 28. The processor may be a microprocessor or microcontroller or other similar data processor. The persistent memory 24, is for example, Non-Volatile Random Access Memory (NVRAM) and stores an FCID Persistent Table 50 containing the FCIDs for the devices that are connected to the switch. The FC switch hardware 26 comprises digital logic and other circuitry configured to perform the FC switching operations in a FC network. The FC switch hardware 26 may be implemented by one or more application specific integrated circuits (ASICs). The memory 27 may comprise read only memory (ROM), random access memory (RAM), magnetic disk storage media devices, optical storage media devices, flash memory devices, electrical, optical, acoustical or other physical/tangible memory storage devices. The memory 27 stores reserved domain field values to run-time domain mapping assignment data 60 and instructions for FCID domain relative addressing and storage process logic 100. Thus, the memory 27 may comprise one or more computer readable storage media encoded with software comprising computer executable instructions and when the software is executed operable to perform the operations described herein for the process logic 100. The processor 22 executes the process logic 100 in order to store FCIDs in the FCID Persistent Table 50 in persistent memory 24 and also to store the mapping assignment data 60. The network interfaces 28 include suitable FC interfaces for connection to an FC network and also any other network for control/command functions associated with the FC switch.

Figures 3, 4:
FIG. 3 is an example of a diagram generally depicting how the relative addressing scheme uses reserved domain field values for corresponding domains in virtual storage area networks.
FIG. 4 is an example of a diagram illustrating the reserved domain field values that are used to map to actual values of run-time domains.

Reference is now made to FIGS. 3 and 4 for a general description of the FCID domain relative addressing scheme. An FCID is a 24-bit address used to route data traffic to and from devices that are part of a FC network. FIG. 3 illustrates the format of an actual FCID and also for a stored FCID according to the techniques described herein. An FCID comprises three fields: a Domain field 70, an Area field 72 and a Port field 74, each of which is 8-bits as defined by the Fibre Channel standard. The Domain field 70 is initialized by the local switch with the value of the current run-time domain. The Area field 72 and Port field 74 can be concatenated together to create a 16-bit Port field with no port groupings. In FIG. 3, the "*" signifies to look at relative addressing information for this domain if value in this field is one of several reserved values that are mapped to actual run-time domains.

When the Domain field 70 is 8-bits, there are a total of 256 possible values that can be created from the 8-bits. However, as shown in FIG. 4, only Domain field values "1" to "239" are valid and usable values, while "0" and "240"-"255" are reserved Domain field values that are not to be explicitly used in the Fibre Channel network for FCIDs according to the applicable Fibre Channel industry standards. Thus, reserved Domain field values "0" and "240"-"255" are used in a relative addressing scheme to map to actual values of run-time domains of FCIDs to avoid losing Area and Port fields values if that run-time domain changes. These values are Reserved values that are used to identify a "starred" domain to map to actual values of run-time domains of FCIDs to avoid losing Area and Port fields if that run-time domain changes.

Turning to FIG. 5, a table is shown that reflects the reserved Domain field values and their corresponding Hexadecimal values. There are 17 Domain field values that can be used to identify a "starred" domain that maps to actual values of run-domain domains of FCIDs in a VSAN to avoid losing Area and Port fields if that run-time domain changes. The assignment of an actual run-time Domain to a reserved Domain field value is completely arbitrary, but once it is set, then it stays that way in order to later retrieve the values of the Area and Port fields of FCIDs that are part of a run-time domain that changes. For example, the first run-time domain assigned in a given VSAN (referred to as "VSAN x") is mapped to reserved domain value 0 ("00" Hex), the second run-time domain assigned in VSAN x is mapped to reserved domain value 240 ("240" Hex), and so on, up until the $17^{th}$ run-time domain assigned in VSAN x.

Figure 6:
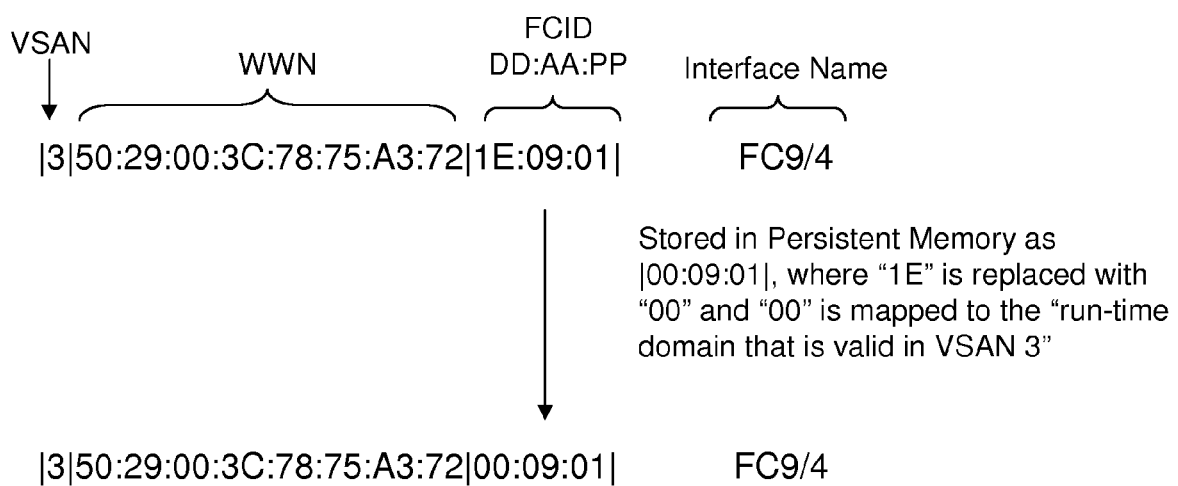
FIG. 6 is a diagram illustrating an example of the relative mapping scheme for a Fibre Channel identifier.

Reference is now made to FIG. 6 for a further example of a complete FCID entry in the FCID Persistent Table 50 in persistent memory 24 using the relative addressing scheme. An entry in the FCID Persistent Table 50 comprises a VSAN identifier, a World Wide Name (WWN) and an FCID. In addition, the table entry may also include an Interface Name. The Interface Name is a name of the port the device that was assigned the corresponding FCID is attached to. In this example, the actual FCID "1E:09:01" (Hex) represents Domain "1E", Area "09" and Port "01". When Domain "1E" is mapped using the relative addressing scheme to reserved Domain field value "00", then the FCID stored in the FCID Persistent Table 50 is "00:09:01", where "1E" is replaced with "00" and "00" is mapped to the run-time domain that is valid in VSAN 3. Consequently, should the run-time domain in VSAN 3 become invalid (or change), there would be no need to delete the stored entry because "00" stored in the Persistent Table 50 means "whatever run-time domain happens to be valid in VSAN 3". The reserved Domain field "00" indicates this relative addressing relationship. Therefore, the Area field value "09" and Port field value "01" for FCID example are not lost when run-time domain "1E" changes or otherwise becomes invalid.

The VSAN and WWN of a device constitute the key uniquely identifying an entry in the FCID Persistent Table 50. A system administrator may manually enter the FCIDs via a command line interface or he/she can also let the switch automatically populate the FCID Persistent Table 50 in persistent memory 24 when a device logs into the switch. Many system administrators enter FCIDs manually because they want the FCIDs to follow a precise scheme. For example, some administrators may assign FCIDs following a "front-panel order" where the Area field is a line-card slot and the Port field is the port number, as shown below:

|3|21:00:3C:78:75:A3:72|1E:01:01| assigned to Interface Name FC1/1

|3|21:00:3D:78:75:A3:66|1E:01:02| assigned to Interface Name FC1/2

|3|21:00:30:78:75:A3:58|1E:01:XX| assigned to Interface Name FC1/XX

|3|21:00:3E:78:75:A3:59|1E:01:20| assigned to Interface Name FC1/32

|3|22:00:3C:78:75:A3:72|1E:02:01| assigned to Interface Name FC2/1

|3|22:00:3D:78:75:A3:66|1E:02:02| assigned to Interface Name FC2/2

|3|22:00:30:78:75:A3:58|1E:02:XX| assigned to Interface Name FC2/XX

|3|22:00:3E:78:75:A3:59|1E:02:30| assigned to Interface Name FC2/48

|3|29:00:3C:78:75:A3:72|1E:09:01| assigned to Interface Name FC9/1

|3|29:00:3D:78:75:A3:66|1E:09:02| assigned to Interface Name FC9/2

|3|29:00:30:78:75:A3:58|1E:09:XX| assigned to Interface Name FC9/XX

|3|29:00:3E:78:75:A3:59|1E:09:10| assigned to Interface Name FC9/16

The problem arises when the run-time domain changes, e.g., run-time domain "1E" in the example above. All of the entries in the persistent memory associated with the domain "1E" are wiped clean, even if the system administrator had manually entered them one at a time.

Reference is now made to FIG. 7 for a further example when a VSAN has more than one run-time domain. In this example, VSAN 2 has two run-time domains: 10 and 20. Domain 10 is mapped to reserved domain field value 0="00" Hex and Domain 20 is mapped to reserved domain field value 240="F0" Hex. FIG. 7 shows examples of four entries in the Persistent FCID Table for devices on an FC switch in VSAN 3. The underlined Domain field values "F0" and "00" are the reserved domain field values assigned to Domain 10 and Domain 20, respectively. In this example, Domain "00" Hex means the first run-time domain in this VSAN, i.e., Domain 10 and Domain "F0" Hex means the second run-time domain in this VSAN, i.e., Domain 20.

Thus, as depicted in FIGS. 3-7, for domain a given existing VSAN, the domain values used are [1 . . . 239] and [0, 240 . . . 255], where for backward compatibility purposes [1 . . . 239] are still used for their absolute values, while [0, 240 . . . 255] are used in the relative way: 0 meaning the first run-time domain in a given VSAN, 240 means second run-time domain in that VSAN, . . . , 255 means 17th run-time domain in that VSAN. If the run-time domain changes, the Area and Port fields in persistent memory do not have to be wiped out.

However, a similar relatively addressing scheme can be used for a newly created VSAN where even the non-reserved domain values [1 . . . 239] that are normally used for run-time domains [1 . . . 239] can be assigned and interpreted in a relative way instead of an absolute way. Thus, for domain values [1 . . . 239], a relatively addressing scheme is used that is similar to that described above for the reserved domain values [0, 240 . . . 255], where 1 means first run-time domain in the VSAN, 2 means second run-time domain in the VSAN, . . . , 239 means 239th run-time domain in the VSAN. A table similar to that shown in FIG. 5 would be created for regular run-time domain values [1 . . . 239]. Thus, if the run-timed domain changes for the VSAN, the Area and Port fields in persistent memory do not have to be wiped out.

The advantage of the use of the reserved domain values [0, 240 . . . 255] approach is that it can be used for an existing VSAN because the normal domain values [1 . . . 239] are continued to be used in an absolute way, while the remaining 17 reserved domain values are used in a relative way (so even if the run-time domain changes, their corresponding FCID entries do not need to be changed. However, only 17 run-time domains out of the available run-time domains can be protected using the reserved domain values for an existing VSAN. The advantage of the using the non-reserved domain values [1 . . . 239] in the relative approach is that it can handle all 239 domains in a relative way, though it is not backwards compatible.

Figure 8:
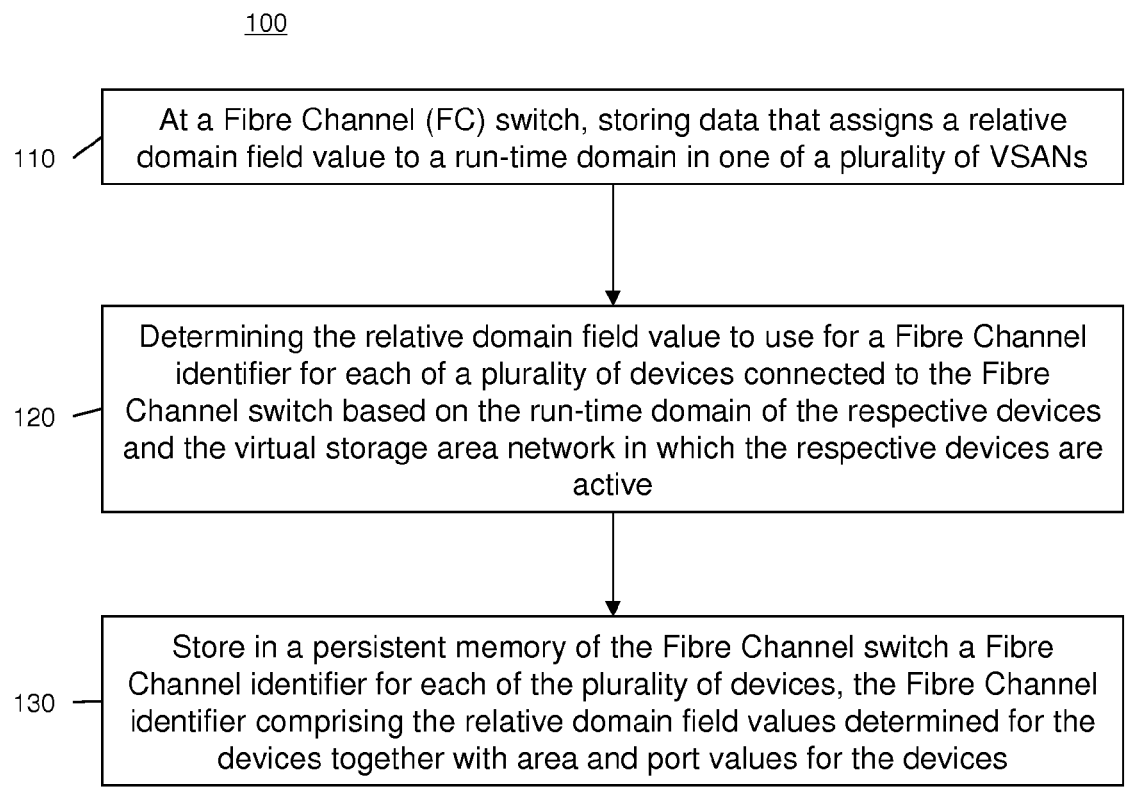
FIGS. 8 and 9 are examples of flow charts depicting operations of relative addressing and storage process logic in a Fibre Channel switch.

Reference is now made to FIG. 8 for a description of the operations of the FCID domain relative addressing and storage process logic 100. At 110, at a Fibre Channel switch, data is stored that assigns a relative domain field value to a run-time domain in one of a plurality of VSANs. When the switch is configured to serve devices in a plurality of run-time domains, then the operation 110 involves storing data that assigns each of a plurality of reserved domain field values to a corresponding one of a plurality of run-time domains in the plurality of virtual storage area networks. The data stored at operation 110 corresponds to the data shown at reference numeral 60 in memory 27, and an example of a representation of this data is shown in FIG. 5 when a reserved domain value is used. However, as explained above, a non-reserved or regular domain value can be used in a relative manner for a new VSAN. Thus, the relative domain value referred to at 110 in FIG. 8 is either a reserved domain field value (for an existing VSAN) or any of the regular domain field values for a new VSAN. Consequently, when the switch serves devices in multiple run-time domains, then the stored data assigns a unique relative domain field value to each run-time domain within a given virtual storage area network. The relative domain field value is "relative" as opposed to "absolute" because it corresponds to a run-time domain in a VSAN that is defined not directly by the domain value itself but instead by a corresponding relative assignment to a run-time domain in a given VSAN (e.g., a first domain field value represents a $1^{st}$ run-time domain in VSAN x, a second domain field value represents a $2^{nd}$ run-time domain in VSAN x, and so on.)

At 120, the processor of the Fibre Channel switch determines the relative domain field value to use for a Fibre Channel identifier for each of a plurality of devices connected to the Fibre Channel switch based on the run-time domain of the respective devices and the virtual storage area network in which the respective devices are active. Moreover, when a switch is configured to serve a plurality of run-time domains, operation 120 involves determining which of the plurality of plurality of relative domain field values to use for a Fibre Channel identifier for each of the plurality of devices based on which of the plurality of run-time domains is assigned to the respective devices and the virtual storage area network in which the respective devices are active.

Operation 130 involves the storage of the Fibre Channel identifiers in persistent memory. Specifically, a Fibre Channel identifier for each of the plurality of devices is stored in the FCID Persistent Table in persistent memory of the Fibre Channel switch, where the Fibre Channel identifier comprises the relative domain field values determined for the respective devices together with area and port values for the devices. At the completion of operation 130, the switch is configured to perform normal Fibre Channel switching operations with respect to traffic to and from the plurality of devices using their respective Fibre Channel identifiers determined according to operation 120.

Figure 9:
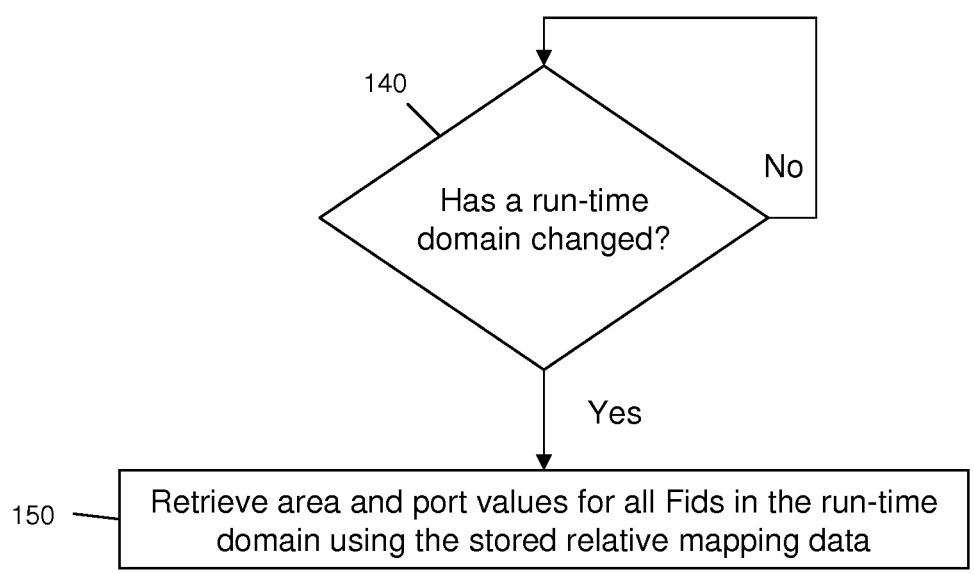

Turning now to FIG. 9, additional operations of the process logic 100 are described when the switch is already configured with the Fibre Channel identifiers for the devices it serves. At 140, a determination is made as to whether a run-time domain served by the switch has changed. A run-time domain may change and become invalid for a variety of reasons. For example, two virtual area networks may merge such that two switches have the same domain. As a result, one of the switches needs to get a new domain. When a run-time domain changes, the run-time domain is no longer valid. As a result, if the absolute run-time domain value was stored in the Fibre Channel identifier for the devices in that run-time domain, the Area and Port values of their Fibre Channel identifiers would also have to be invalidated, since together with the now invalid domain, they are part of the same Fibre Channel identifier. This is not the case, however, when the relative addressing scheme is employed such that a relative run-time domain value instead of the actual run-time domain value is stored in the Fibre Channel identifiers for the run-time domain. Thus, when a run-time domain change is determined to occur at 140, then at 150, the processor in the switch can retrieve the Area and Port values stored for the Fibre Channel identifiers that include that relative run-time domain value. The Fibre Channel identifiers for that run-time domain that have changed are thus preserved despite the domain change. Therefore, there is no need for a system administrator to reprogram the Fibre Channel identifiers after a domain change. Moreover, the Fibre Channel identifiers can be entered once by the system administrator and need not be re-entered when a domain change occurs.

When storing Fibre Channel identifiers for devices, the relative addressing scheme described herein is compatible with the absolute addressing scheme on the same switch, even for Fibre Channel identifiers associated with the same run-time domain within the same VSAN. That is, for some Fibre Channel identifiers in the same run-time domain, the actual domain value may be stored in the Fibre Channel identifier and for other Fibre Channel identifiers in that run-time domain, the assigned relative domain value is stored using the relative addressing scheme.

Furthermore, the relative addressing domain value techniques described herein may be used when a single domain is assigned to a switch within a VSAN as well as when more than one domain is assigned to a single switch within the same VSAN. This is depicted above in the example of FIG. 7.

Fibre Channel switches use persistent memory to store Fibre Channel identifiers to account for a situation when the switch has to reboot. In the event of a switch reboot, all devices that need to login to the switch will try to log in to get a new Fibre Channel identifier. Some devices will request a generic Fibre Channel identifier (as opposed to the previously assigned identifier) but unless they get the same Fibre Channel identifier as they used prior to switch reboot, those devices will "lock-up" and not operate properly in the Fibre Channel network. Consequently, a persistent memory, e.g., battery powered RAM, is used to store the Fibre Channel identifier to account for such devices. However, when the relative addressing scheme described herein is employed, the switch will return the same Fibre Channel identifier as before (including Area and Port field values) because the loss of the run-time domain does not cause the switch to lose the Area and Port field values as described herein.

To restate the techniques described herein, current FCID assignment and storage techniques store the three absolute values of the Domain, Area and Port fields of a FCID. This implies that when the current run-time domain changes, the corresponding FCIDs become invalid, all at once, causing both frustration to system administrators that may have configured the FCIDs manually one at a time, as well as potential performance problems in the Fibre Channel network. These issues can be avoided by not explicitly storing the run-time domains in the FCIDs, and instead using a relative addressing scheme to store relative domain field values that are either special reserved domain field values (e.g., "0" and "240"-"255") associated respectively with the first, the second, . . . , and the last run-time domains in a particular VSAN or regular domain field values associated with a new VSAN that are assigned in a relative manner as described herein.

A further advantage of the techniques described herein is that, because FCIDs are stored in persistent memory, to delete them is slower than if they were stored in volatile memory, e.g., volatile RAM. Moreover, to delete potentially up to thousands of FCIDs in one instance when the run-time domain(s) changes can also have a performance impact on the switch, which is already under stress for having to re-run several network protocols in order to reassign the run-time domains that become invalid within various VSANs. Thus, by employing the techniques described herein, the switch does not need to wipe clean the up to thousands of entries that are part of the FCID Persistent Table every time the run-time domain(s) associated with the various VSANs become invalid.

In sum, a method is provided comprising: at a Fibre Channel switch, storing data that assigns a relative domain field value to a run-time domain in one of a plurality of virtual storage area networks; determining the relative domain field value to use for a Fibre Channel identifier for each of a plurality of devices connected to the Fibre Channel switch based on the run-time domain of the respective device and the virtual storage area network in which the respective devices are active; and storing in a memory of the Fibre Channel switch a Fibre Channel identifier for each of the plurality of devices, the Fibre Channel identifier comprising the relative domain field value determined for the device together with area and port values for the device.

In addition, an apparatus is provided (as depicted in FIG. 2 for example) comprising a network interface unit configured to enable communications over a Fibre Channel network; a first memory that is configured to store data that assigns a relative domain field value to a run-time domain in one of a plurality of virtual storage area networks; a second memory; and a processor configured to be coupled to the network interface unit, to the first memory and to the second memory. The processor is configured to: determine the relative domain field value to use for a Fibre Channel identifier for each of a plurality of devices based on the run-time domain of the respective device and the virtual storage area network in which the respective device is active; and store in the second memory a Fibre Channel identifier for each of the plurality of devices, the Fibre Channel identifier comprising the relative domain field value determined for the device together with area and port values for the device.

Further still, provided herein is one or more computer readable storage media encoded with software comprising computer executable instructions and when the software is executed operable to: at a Fibre Channel switch, store data that assigns a relative domain field value to a run-time domain in one of a plurality of virtual storage area networks; determine the reserved domain field value to use for a Fibre Channel identifier for each of a plurality of devices connected to the Fibre Channel switch based on the run-time domain of the respective device and the virtual storage area network in which the respective device is active; and store in a memory of the Fibre Channel switch a Fibre Channel identifier for each of the plurality of devices, the Fibre Channel identifier comprising the relative domain field value determined for the device together with area and port values for the device.

The above description is intended by way of example only.

What is claimed is:

1. A method comprising:
    at a Fibre Channel switch, storing data that assigns a relative domain field value that is mapped to a run-time domain in one of a plurality of virtual storage area networks, wherein the relative domain field value is a reserved domain field value and is identified with particular run-time domains;
    determining the relative domain field value to use for a Fibre Channel identifier for each of a plurality of devices connected to the Fibre Channel switch based on the run-time domain of the respective device and the virtual storage area network in which the respective device is active such that the Fibre Channel identifier does not change even if the run-time domain of the respective device changes; and
    storing in a memory of the Fibre Channel switch the Fibre Channel identifier for each of the plurality of devices, the Fibre Channel identifier comprising the relative domain field value determined for the device together with area and port values for the device.

2. The method of claim 1, wherein the relative domain field value is a reserved domain field value that is not to be explicitly used in a Fibre Channel network for Fibre Channel identifiers according to the applicable Fibre Channel industry standards.

3. The method of claim 1, wherein the relative domain field value is a domain field value that is associated with a newly created virtual storage area network.

4. The method of claim 1, and further comprising determining when a change occurs in the run-time domain, and retrieving area and port values for Fibre Channel identifiers in the run-time domain using the data stored in the memory.

5. The method of claim 4, and further comprising performing Fibre Channel switching operations at the Fibre Channel switch with respect to traffic to and from the plurality of devices using the retrieved area and port values for the Fibre Channel identifiers in the run-time domain.

6. The method of claim 1, wherein storing data comprises storing data that assigns each of a plurality of relative domain field values to a corresponding one of a plurality of run-time domains in the plurality of virtual storage area networks, and wherein determining comprises determining which of the plurality of plurality of relative domain field values to use for a Fibre Channel identifier for each of the plurality of devices based on which of the plurality of run-time domains is assigned to the respective devices and the virtual storage area network in which the respective devices are active.

7. The method of claim 6, wherein storing data comprises storing data that assigns a unique relative domain field value to each run-time domain within a given virtual storage area network.

8. The method of claim 6, and further comprising determining when a change occurs in a particular run-time domain of the plurality of run-time domains, and retrieving area and port values for Fibre Channel identifiers in the particular run-time domain using the data stored in the memory.

9. The method of claim 1, wherein storing in the memory comprises storing the Fibre Channel identifiers for the plurality of devices in a persistent memory in the Fibre Channel switch.

10. The method of claim 1, wherein storing data that assigns the relative domain field value comprises storing data that assigns the relative domain field value that is either a special reserved domain field value associated with a respective run-time domain in a particular virtual storage area network or a regular domain field value assigned in a relative manner and associated with a new virtual storage area network.

11. An apparatus comprising:
a network interface unit configured to enable communications over a Fibre Channel network;
a first memory that is configured to store data that assigns a relative domain field value that is mapped to a run-time domain in one of a plurality of virtual storage area networks, wherein the relative domain field value is a reserved domain field value and is identified with particular run-time domains;
a second memory; and
a processor configured to be coupled to the network interface unit, to the first memory and to the second memory, the processor configured to:
determine the relative domain field value to use for a Fibre Channel identifier for each of a plurality of devices based on the run-time domain of the respective devices and the virtual storage area network in which the respective devices are active such that the Fibre Channel identifier does not change even if the run-time domain of the respective device changes; and
store in the second memory the Fibre Channel identifier for each of the plurality of devices, the Fibre Channel identifier comprising the relative domain field value determined for the device together with area and port values for the device.

12. The apparatus of claim 11, wherein the relative domain field value is a reserved domain field value that is not to be explicitly used in a Fibre Channel network for Fibre Channel identifiers according to the applicable Fibre Channel industry standards.

13. The apparatus of claim 11, wherein the relative domain field value is a domain field value that is associated with a newly created virtual storage area network.

14. The apparatus of claim 11, and further comprising switch circuitry configured to perform Fibre Channel switching operations with respect to traffic to and from the plurality of devices using their respective Fibre Channel identifiers.

15. The apparatus of claim 14, wherein the processor is configured to determine when a change occurs in the run-time domain and to retrieve area and port values for Fibre Channel identifiers in the run-time domain using the data stored in the memory, and wherein the switch circuitry is configured to perform Fibre Channel switching operations using the retrieved area and port values for the Fibre Channel identifiers in the run-time domain.

16. The apparatus of claim 11, wherein the first memory is configured to store data that assigns each of a plurality of relative domain field values to a corresponding one of a plurality of run-time domains in the plurality of virtual storage area networks, and wherein the processor is configured to determine which of the plurality of plurality of relative domain field values to use for a Fibre Channel identifier for each of the plurality of devices based on which of the plurality of run-time domains is assigned to the respective devices and the virtual storage area network in which the respective devices are active.

17. The apparatus of claim 11, wherein the first memory is a persistent memory.

18. One or more non-transitory computer readable storage media encoded with software comprising computer executable instructions and when the software is executed operable to:
at a Fibre Channel switch, store data that assigns a relative domain field value that is mapped to a run-time domain in one of a plurality of virtual storage area networks, wherein the relative domain field value is a reserved domain field value and is identified with particular run-time domains;
determine the relative domain field value to use for a Fibre Channel identifier for each of a plurality of devices connected to the Fibre Channel switch based on the run-time domain of the respective devices and the virtual storage area network in which the respective devices are active such that the Fibre Channel identifier does not change even if the run-time domain of the respective device changes; and
store in a memory of the Fibre Channel switch the Fibre Channel identifier for each of the plurality of devices, the Fibre Channel identifier comprising the relative domain field value determined for the device together with area and port values for the device.

19. The one or more computer readable storage media of claim 18, wherein the relative domain field value is a reserved domain field value that is not to be explicitly used in a Fibre Channel network for Fibre Channel identifiers according to the applicable Fibre Channel industry standards.

20. The one or more computer readable storage media of claim 19, and further comprising instructions that are operable to cause the Fibre Channel switch to perform Fibre Channel switching operations with respect to traffic to and from the plurality of devices using the retrieved area and port values for the Fibre Channel identifiers in the run-time domain.

21. The one or more computer readable storage media of claim 18, wherein the relative domain field value is a domain field value that is associated with a newly created virtual storage area network.

22. The one or more computer readable storage media of claim 18, wherein the instructions that are operable to determine comprise instructions that are operable to determine when a change occurs in the run-time domain, and to retrieve area and port values for Fibre Channel identifiers in the run-time domain using the data stored in the memory.

23. The one or more computer readable storage media of claim 18, wherein the instructions that are operable to store data comprise instructions that are operable to store data that assigns each of a plurality of relative domain field values to a corresponding one of a plurality of run-time domains in the plurality of virtual storage area networks, and wherein the instructions that are operable to determine comprise instructions that are operable to determine which of the plurality of plurality of relative domain field values to use for a Fibre Channel identifier for each of the plurality of devices based on which of the plurality of run-time domains is assigned to the respective devices and the virtual storage area network in which the respective devices are active.

24. The one or more computer readable storage media of claim 23, and further comprising instructions that are operable to determine when a change occurs in a particular run-time domain of the plurality of run-time domains, and to retrieve area and port values for Fibre Channel identifiers in the particular run-time domain using the data stored in the memory.

\* \* \* \* \*